(12) United States Patent
Haid (10) Patent No.: US 11,620,196 B2
(45) Date of Patent: Apr. 4, 2023

(54) COMPUTER DUPLICATION AND CONFIGURATION MANAGEMENT SYSTEMS AND METHODS

(71) Applicant: Stratus Technologies Bermuda, Ltd., Hamilton (BM)

(72) Inventor: Steven Michael Haid, Bolton, MA (US)

(73) Assignee: STRATUS TECHNOLOGIES IRELAND LTD.

( * ) Notice: Subject to any disclaimer, the term of this patent is extended or adjusted under 35 U.S.C. 154(b) by 173 days.

(21) Appl. No.: 16/900,914

(22) Filed: Jun. 13, 2020

(65) Prior Publication Data
US 2021/0034483 A1 Feb. 4, 2021

Related U.S. Application Data

(60) Provisional application No. 62/881,301, filed on Jul. 31, 2019.

(51) Int. Cl.
*G06F 11/20* (2006.01)
*G06F 9/4401* (2018.01)
*G06F 9/445* (2018.01)

(52) U.S. Cl.
CPC ........ *G06F 11/2069* (2013.01); *G06F 9/4411* (2013.01); *G06F 9/4451* (2013.01); *G06F 11/203* (2013.01)

(58) Field of Classification Search
CPC .. G06F 11/2069; G06F 9/4411; G06F 9/4451; G06F 11/203
See application file for complete search history.

(56) References Cited

U.S. PATENT DOCUMENTS

| | | | |
|---|---|---|---|
| 6,355,991 B1 | 3/2002 | Goff et al. |
| 6,633,996 B1 | 10/2003 | Suffin et al. |
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |
| 6,718,474 B1 | 4/2004 | Somers et al. |
| 6,766,413 B2 | 7/2004 | Newman |

(Continued)

OTHER PUBLICATIONS

Dong et al., "COLO: COarse-grain LOck-stepping Virtual Machine for Non-stop Service", SoCC'13,Oct. 1-3, 2013, Santa Clara, California, USA, ACM 978-1-4503-2428-1; 16 pages.

(Continued)

*Primary Examiner* — Tammara R Peyton
(74) *Attorney, Agent, or Firm* — K&L Gates LLP (57) ABSTRACT

In part, the disclosure relates to systems and methods to rapidly copy the computer operating system, drivers and applications from a source computer to a target computer using a duplication engine. Once the copy is complete the source computer will resume execution, and the target computer will first alter its configuration (also referred to as a role or personality) and then resume execution conforming to its new configuration as indicated by a profile stored in protected or specialized memory. The profile can be value, a file, or other memory structure and is protected in the sense that the profile (and or the region of memory where it is stored) must not be overwritten by a state transfer from the source computer to the target computer.

14 Claims, 4 Drawing Sheets

(56) References Cited

U.S. PATENT DOCUMENTS

| | | |
|---|---|---|
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |
| 6,928,583 B2 | 8/2005 | Griffin et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Beik et al. |
| 8,312,318 B2 | 11/2012 | Graham et al. |
| 8,381,012 B2 | 2/2013 | Wiebe |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 10,360,117 B2 | 7/2019 | Haid et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2015/0205688 A1 | 7/2015 | Haid et al. |
| 2015/0263983 A1 | 9/2015 | Brennan et al. |
| 2016/0246799 A1* | 8/2016 | Constantinescu ... G06F 16/1748 |
| 2017/0324609 A1 | 11/2017 | Hong et al. |
| 2018/0046480 A1 | 2/2018 | Dong et al. |
| 2018/0143885 A1 | 5/2018 | Dong et al. |
| 2020/0050523 A1 | 2/2020 | Pawlowski et al. |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

COMPUTER DUPLICATION AND CONFIGURATION MANAGEMENT SYSTEMS AND METHODS

RELATED APPLICATIONS

This application claims the benefit of priority to U.S. Provisional Application No. 62/881,301, filed Jul. 31, 2019, and which is incorporated herein by reference in its entirety.

FIELD

The disclosure relates generally to management of roles or identities of computing devices and more specifically to managing of computing devices in a fault tolerant system such, for example, an active active system and an operating system-based implementation of such a system.

BACKGROUND

There are a variety of ways to achieve fault tolerant computing in a server system. As an example, it is possible to connect two (or more) computers, such that one computer, the primary computer (also referred to as a machine or node) actively makes calculations or obtains data requested by a client while the secondary computer makes the same calculations as the primary computer to shadow the results of the primary computer. This form of fault tolerant computing, termed active-active fault tolerance, is performed in case the primary computer, or hardware or software component thereon, experiences some type of failure. In these systems, the information about the current state of the primary computer must be periodically saved to the secondary computer so that the primary and secondary computers are substantially synchronized and the secondary computer can substantially take over computation at the point in the calculations where the active primary computer experienced a failure.

The periodic transfer of data to maintain synchrony between the states of the primary and secondary computers is termed checkpointing. A checkpoint defines a point in time when the data is to be transferred from the primary to the secondary computer. A checkpoint controller, which is typically a software module, determines when a checkpoint is declared to occur. During a checkpoint, the processing on the primary computer is at some point paused, so that the final state of the primary machine and associated memory is not changed during the checkpoint interval and once the relevant data is transferred, both the primary and secondary computers are in the same state. When the transfer of information between the primary and secondary computers is complete, the checkpoint is complete, and the execution by the primary and secondary computers is resumed and continues to run the application until the next checkpoint, when the process repeats.

Checkpoints can be determined by the checkpoint controller either to occur by the passage of a fixed amount of elapsed time from the last checkpoint, or by the occurrence of some event, such as: the number pages of memory modified (termed dirty pages); the occurrence of a network event (such as network acknowledgement output from the primary computer); or the occurrence of excessive buffering on the secondary computer (as compared to available memory) during the execution of the application. Elapsed time checkpointing is considered fixed checkpointing, while event based checkpointing is considered dynamic or variable-rate checkpointing.

In summary the process of checkpointing generally involves copying the operational state (both memory and processor state) of the primary system to the secondary system In this way, the two systems operate in a fault tolerant manner, with the secondary system available if the primary system fails or experiences a significant error. This must be done while minimizing the amount of time the primary and secondary computers are paused while the data is moved from the primary to secondary computer.

The present disclosure addresses these challenges and others.

SUMMARY

In part, the disclosure relates to systems and methods to rapidly copy the computer operating system, drivers and applications from a source computer to a target computer using a duplication engine such as a checkpointing engine. Once the copy to target computer is complete, the source computer resumes execution, and the target computer will first alter its profile (also referred to as a configuration, role or personality) and then resume execution. The target computer will conform to its new configuration as indicated by the profile stored in protected or specialized memory. The profile can be value, a file, or other memory structure and is protected in the sense that the profile (and/or the region of memory where it is stored) must not be overwritten by a state transfer from the source computer to the target computer. In one embodiment, the profile and the duplication engine work in concert with drivers that are designed with different operational modes that are governed by the profile of the computer on which they operate.

In an embodiment, a method of managing operation of computing system includes sending a request, from a target computer, to initiate a duplication process from the source computer; upon receipt of the request, notifying, at the source computer, each application and device to prepare for the impending duplication process; creating, at the source computer, a copy of the memory and processor state; sending the copy of the memory and processor state of the source computer to the target computer; establishing the configuration at the target computer; applying, at the target computer, the copy received from the source computer; and resuming execution of the source computer and the target computer.

One or more of the following features may be included. In one embodiment, the method may include providing a profile on the target computer, wherein the profile includes one or more possible configurations of the target computer. In one embodiment, the configuration profile is stored in reserved memory on the target computer, wherein the reserved memory is protected from being overwritten by the duplication process. In one embodiment, the method may include checking contents of reserved memory for profile; and changing driver operation in response to the profile. In one embodiment, the copy of the memory and processor state are sent to duplication engine of target computer. In one embodiment, establishing the configuration at the target computer is performed with regard to network and storage drivers of target computer. In one embodiment, the reserved memory is selected from the group consisting of portable memory device, memory stick, USB memory device, CMOS memory, NVRAM, BIOS, EPROM, and RAM.

One or more of the following features may be included. In one embodiment, the applying, at the target computer, includes receiving the copy of the memory and processor state of the source computer; applying the copy to the target computer; retrieving configuration information from the profile stored in reserved memory on the target computer; and configuring applications and devices on the target computer according to the configuration information. In one embodiment, one or more drivers change mode of operation in response to a change in or a new profile. In one embodiment, establishing the configuration at the target computer is performed using configuration stored in reserved memory of target. In one embodiment, the method may include registering one or more application or device driver such that they are prepared for duplication.

In one embodiment, the configuration indicates a target computer profile of a source computer profile. In one embodiment, the method may include reading configuration from reserved memory, using duplication engine, wherein target computer applies the configuration. In one embodiment, the duplication engine is a checkpoint engine. In one embodiment, the method may include detecting a failure mode or error event at source computer; and changing configuration of target computer. In one embodiment, changing of configuration is performed by duplication engine.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Rapidly initializing a computer operating system, drivers, and applications from a source computer to a target computer can be a complex process. Differences in roles between the source computer and the target computer can further complicate the duplication. Described herein are a systems and methods for duplicating and configuring a target computer based on a source computer and managing the profiles or configurations thereof over time.

In part, the disclosure relates to systems and methods of managing profiles, roles, identities, or configurations of computing devices that may change as a result of a various processes. These processes can include duplication processes, checkpointing process, fault tolerant processes, load balancing, security level control, access level control, or other processes in which one or more operating properties of a given computing device changes. In general, a primary computing device and a secondary computing device may be connected together and programmed to operate as an active active fault tolerant system or other specialized multi-node system. As part of the systems operation, the primary computing device may undergo processes that transfer or duplicate information to secondary computing device. The primary node and the secondary node may have different roles, configurations, etc. (generally referred to as a personality in some embodiments) which are managed using protected memory or through other storage paths and devices.

In one embodiment, each computing device can refer to or check a region of protected memory that is not changed during a duplication process such as a checkpoint. The byte(s), flag(s), pointer(s) or other data structure used to designate a given device's personality causes the device to operate in accordance with that personality in response the relevant data included in protected memory for that purpose.

In some embodiments, the data structure used to designate a device's personality is changed by one or more components or subsystems of the overall system. In this way, if failure mode is detected such as a cessation of a heart beat signal, the data structure of a secondary device can be changed to that of a primary device and vice versus. In this way, the role or personality and operational modes of a given computing device, such as with regard to its drivers in particular, can be transitioned to a new profile or configuration by changing the data structure in protected memory. The typical operation of a given computer system in turn can be governed by what is specified in its profile/configurations. Additional details and further embodiments are discussed in more detail below.

In various embodiments, a computing system with duplication and configuration capabilities includes a source computer and at least one target computer. In one embodiment, a source computer can be referred to as a primary computer, a first node, or a first computer and a target computer can be referred to as a secondary computer, a second node, or a second computer. A fully configured source computer also includes applications, an operating system (OS), and drivers. A target computer at least includes storage, memory, processors, a hardware interface, a duplication engine, and a profile stored in a reserved portion of memory. However, in various embodiments, a target computer can be in various states. For example, in some embodiments, a target computer can be uninitialized without any applications, operating system, or drivers. In another embodiment, a target computer can be in need of re-initialization. For example, a target computer can have applications, an operating system, and drivers that need to be reset into a known state, such as matching a specified source computer or to operate upon a copy of data, memory, state, etc. from such a source computer.

In various embodiments, configuration profiles are stored in areas of memory that are not overwritten during checkpoint operations and/or state transfers between a source and a target computer. In some embodiments, configuration profiles are stored in reserved memory on both the source and target computers. In some embodiments, configuration profiles are stored in CMOS memory. In some embodiments, configuration profiles are stored in NVRAM. In some embodiments, configuration profiles are stored on a memory stick on both the source and target computers. Accordingly, memory sticks and other storages devices for configurations, profiles, etc. are stored on respective device, such as one storage device for target and one storage device for source.

In one embodiment, the target computer profile is made available on the target computer by being written to protected memory or otherwise initialized. This could be achieved by inserting a memory stick containing the profile on the target computer. In one embodiment, the duplication engine or other components described herein can be authorized to write to protected memory and transfer or modify a given profile.

In various embodiments, a configuration profile can include numbers, names, usernames, and/or other keywords to indicate a specific profile. For example, in one embodiment, a personality profile could contain a person's username and password. In some embodiments, each configuration profile includes multiple configurations such that a computer system can be directed to configure itself into one of the multiple configurations. In various embodiments, the profile can be used to redirect and/or redeploy a computer system.

Further, the presence of data in a protected region of memory can be used to indicate that a given computing device is being directed to operate as a primary or source, while the absence of data in the protected region of memory can be used to indicate that the computing device is being directed to operate as a secondary or target. Generally, the presence of a byte or bytes in a protected memory location can be indicative of one profile and the absence of a byte or bytes being indicate of another profile. In various embodiments, a flag or a data-bit is used in protected memory. For example, when a flag is set to '1' that indicates Primary/Source, and when the flag is set to '0' that indicates Secondary/Target. In either case the flag is present in the configuration data. These and other flag conventions can be used without limitation.

For example, if a primary computer fails, a secondary computer can be reconfigured from the profile to take on the role of the primary computer during a failover process. In that instance, the registered applications and devices within the secondary computer would be reconfigured according to the information in the profile. Additionally, the secondary computer's profile may indicate that network hardware is to be turned off to prevent the secondary computer from communicating directly with clients, when the secondary computer is promoted to primary computer during a failover, the network hardware must be turned on to permit the computer to communicate with clients. This change can be useful in active active fault tolerant systems. In one embodiment, the profile of the secondary computer also instructs the secondary computer to monitor the health of the primary computer and take over as primary computer fails.

In various embodiments, the primary and secondary computers use a duplication engine to manage the duplication of the primary computer state and data and the configuration process of the secondary computer after the primary computer state and data has been copied to the secondary computer. The duplication engine may be an extension to the BIOS, and be permanently running on a processor dedicated to this function. In one embodiment, the configuration process determines the behavior of the computer after data and state copying have taken place as discussed above. In one embodiment, the source computer's profile indicates that it is the computer directly communicating with client applications over the Internet.

Within each computer, source and target, devices and applications within the computer register with a duplication engine if their configuration changes depending on the role of the computer. For example, in some embodiments, a source or primary system may solely communicate with clients and a target or secondary may never communicate using a network interface. In the secondary system, its profile could be configured to shutoff the network interface. Each application and device that registers with a source computer will be notified and reconfigured upon duplication to a target computer.

In various embodiments, the duplication and configuration process is initiated when a duplication engine from a target computer requests duplication from a source computer for example during an initial booting sequence. The duplication engine on the source computer notifies each registered device driver and/or application of an impending duplication and configuration process. In one embodiment, the drivers and/or applications are registered to prepare to be duplicated. This preparation process may include them pausing operation, and may further include one or more steps that are dependent on which application or device driver is being notified. In various embodiments, registered device drivers are used. These may include network and storage device drivers. The reason for notifying these device drivers is so they can prepare for duplication. It is possible that in other embodiments, applications may be notified so that they could also prepare to be duplicated.

The duplication engine of source computer takes a snapshot of (or otherwise copies) the state of memory and processors and sends the state to the target computer. In one embodiment, the state is a checkpoint or a portion thereof. Upon receipt of the state, the target computer applies the state and configures the applications and device drivers according to the configuration specified in the target computer's configuration profile. Both the source computer and the target computer continue execution once the duplication and configuration process has completed. In one embodiment, snapshot refers to a copy of the state.

Figure 1:
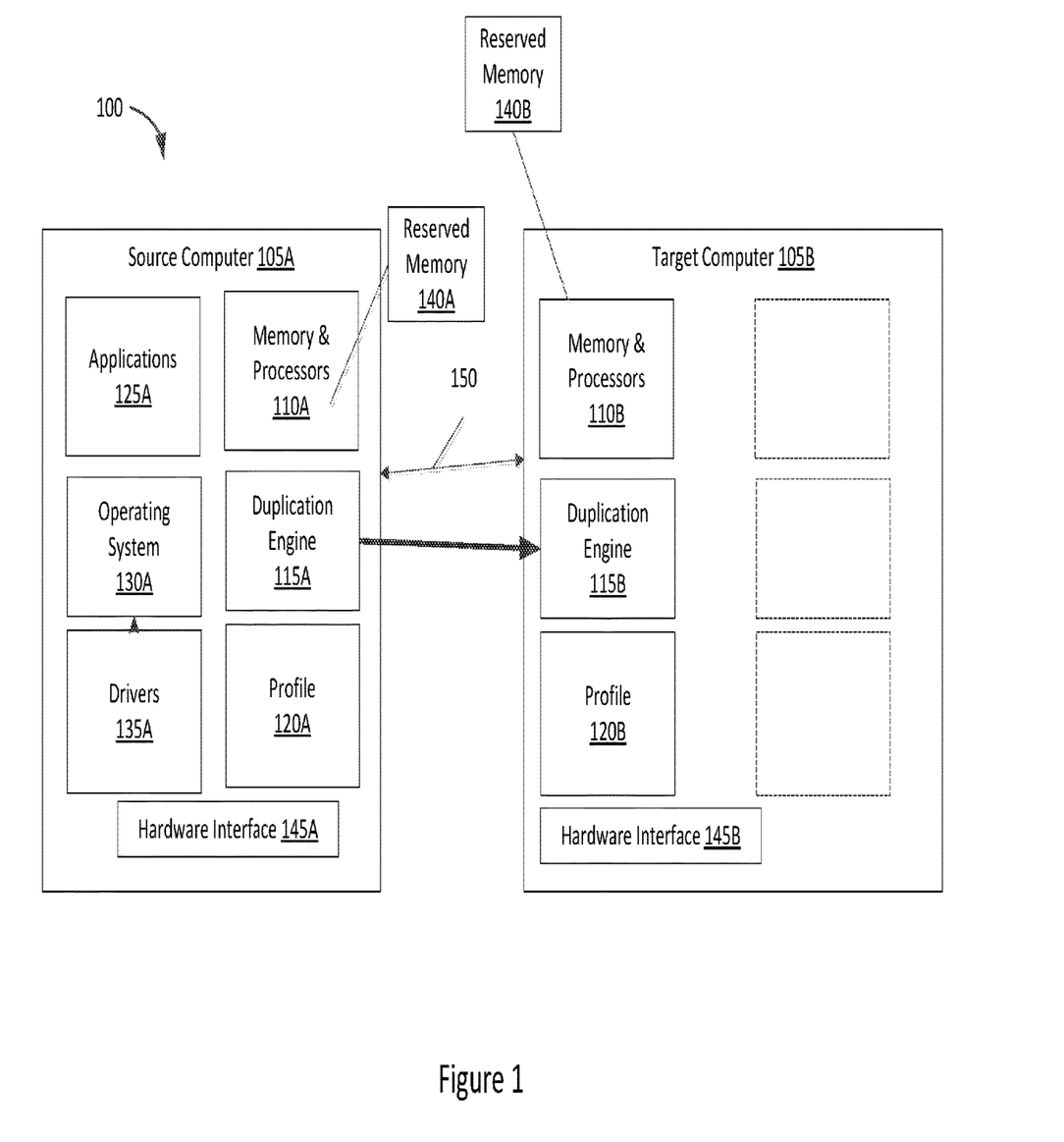
FIG. 1 is a schematic diagram of a source computer linked with a target computer prior to performing a duplication process and/or a profile change in accordance with an embodiment of the disclosure.

FIG. 1 shows a simplified illustration of a computing system in a first operating state, such as prior to duplication, in accordance with an embodiment of the present disclosure. The computing system 100 includes source computer 105A and target computer 105B. Source computer 105A includes memory and processors 110A, duplication engine 115A, a profile 120A, applications 125A, operating system (OS) 130A, drivers 135A, and hardware interface 145A. Target computer 105B includes memory and processors 110B, duplication engine 115B, and profile 120B, and hardware interface 145B. In various embodiments, profile 120A and profile 120B are stored in reserved memory 140A, 140B within the source computer 105A and target computer 105B respectively.

In various embodiments, reserved memory 140A, 140B is protected from being overwritten during the duplication process. In various embodiments, a personality profile defines the personality/configuration of the applications and drivers running on each computer. As shown in FIG. 1, personality profile 120A defines the personality/configuration of applications 125A and drivers 135A running on source computer 105A. Unlike the source computer 105A, target computer 105B does not have any applications, drivers, or an operating system installed and/or configured. That is, prior to the state transfer from target computer or another computer or system, the target computer is not running applications, OS, or drivers, as shown by the boxes having dotted lines on right side of target computer 105B. The target computer 105B is running the duplication engine which will receive the state transfer from the source computer's duplication engine.

In one embodiment, as shown in FIG. 1 each of the source 105A and target computer 105B can use one or more bridges or communication channels as a data interface 150 established between them to, among other things, communicate information relating to the operational state of a given computer such as through a heartbeat signal, or other series of inputs and outputs indicative of the health of the computer. As a result, if the heart beat signal or other suitable inputs and outputs communicated over a bridge or link cease, become irregular, or otherwise deviate from an acceptable level, such an error event can be used to trigger a change in the roles of the source and the target. Specifically, upon detection of an error event, the target computer can become the source computer and the source computer can become the target computer. This can be achieved by changing or effectively swapping the profiles stored in protected memory for each respective computer.

Figure 2:
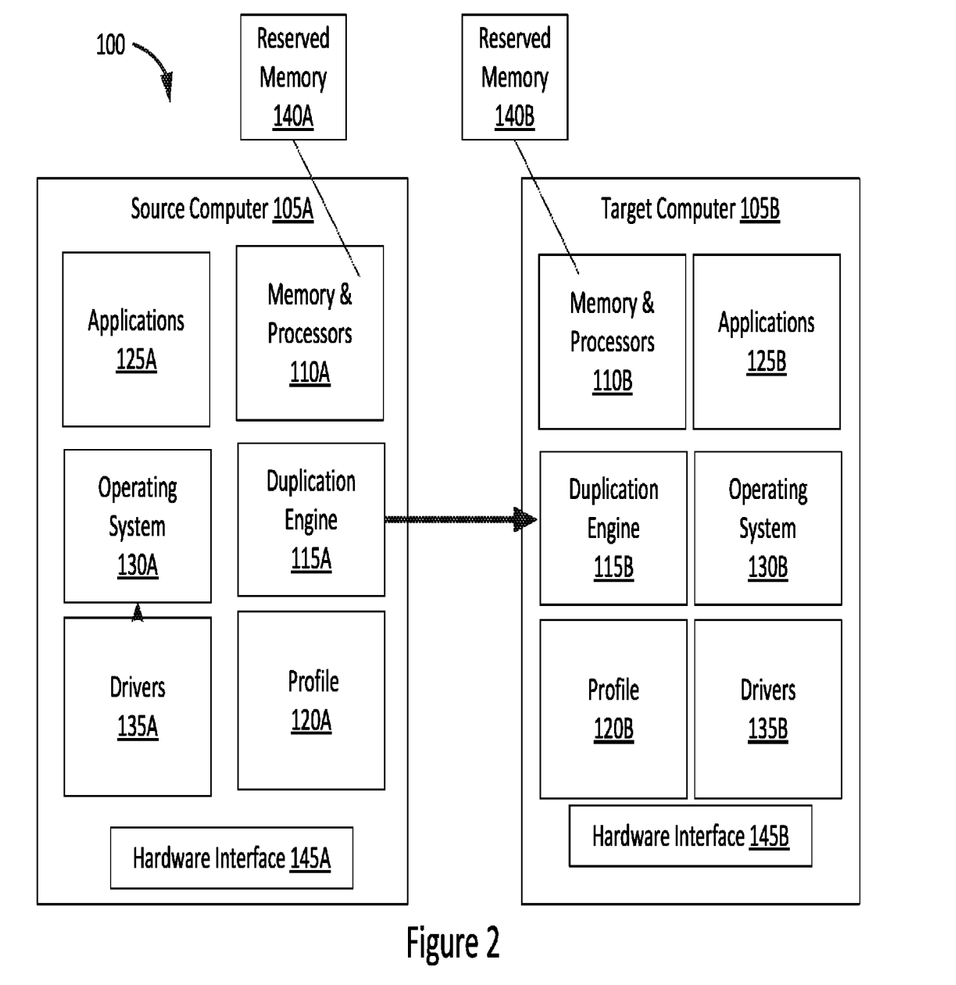
FIG. 2 is a schematic diagram of the source computer and target computer of FIG. 1 after a duplication process and/or a profile change has occurred in accordance with an embodiment of the disclosure.

FIG. 2 shows a simplified illustration of the same server after the primary computer state and memory have been copied to the secondary computer in accordance with an embodiment of the present disclosure. After duplication the secondary computer 105B has received a state and memory transfer from primary computer 105A and directions to use the secondary computer's configuration within it profile 120B to function as a secondary computer 105B. At this point, for example the secondary computer will disable its network hardware because it is not permitted to communicate with the client directly. This is implemented as part of an active active fault tolerant system in some embodiments.

Subsequently if the primary computer fails and a failover to the secondary computer occurs, the secondary computer, now acting as a primary computer loads the configuration profile of a primary computer and reconfigures itself to act as a primary computer. For example, the newly promoted primary computer turns on its network hardware so it can communicate with clients. When compared to the target computer 105B of FIG. 1, the target computer 105B shown in FIG. 2 now includes applications 125B, an operating system 130B, and drivers 135B configured according to one configuration within profile 120B. Following the state transfer the source computer is running the applications, OS, and drivers, conforming to the source computer's profile settings and the target computer is running the applications, OS, and drivers, conforming to the target computer's profile settings.

Figure 3:
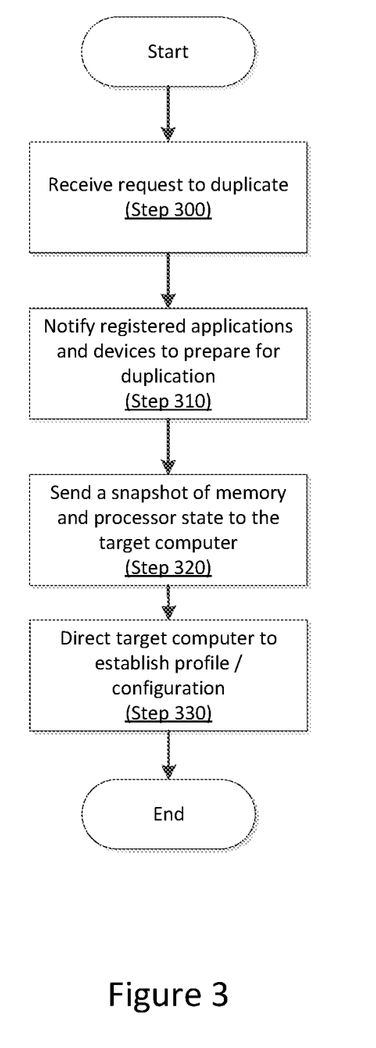
FIG. 3 is flow chart depicting steps for duplicating state and/or other information from a source computer to a target computer that establishes profile/configuration in accordance with an embodiment of the disclosure.

FIG. 3 is a simplified flowchart of a method of duplicating a source computer in a computing system, in accordance with an embodiment of the present disclosure. During a duplication process, the duplication engine 115A receives a request to duplicate from duplication engine 115B on the target computer 105B (Step 300). The duplication engine 115A notifies registered applications 125A and devices on source computer 105A of an impending duplication operation (Step 310). The duplication engine 115A takes a snapshot of the state of the memory and processors 110A and transfers the snapshot to the secondary computer (Step 320). Upon completing the transfer, the duplication engine 115A directs duplication engine 115 as to which configuration within profile 120B to apply to the target computer 105B.

Figure 4:
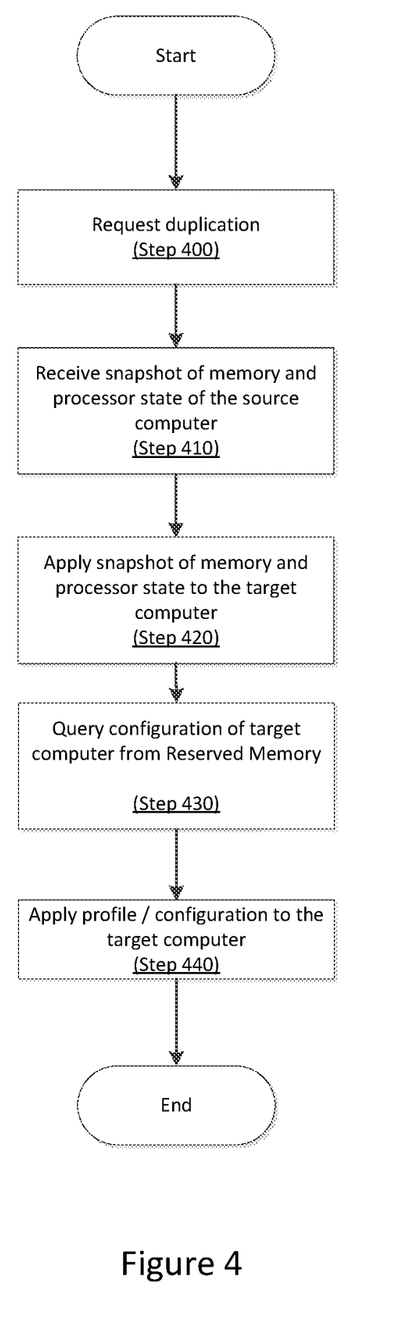
FIG. 4 is flow chart depicting steps for duplicating state and/or other information from a source computer to a target computer that applies profile/configuration to target computer in accordance with an embodiment of the disclosure.

FIG. 4 is a simplified flowchart of a method of updating and configuration a target computer in a computing system during a duplication process, in accordance with an embodiment of the present disclosure. Upon initialization, the target computer has memory and processors 110B, a duplication engine 115B, a profile 120B stored within reserved memory 140B, and a hardware interface 145B for communicating with source computer 105A. Duplication engine 115B sends a request for duplication to source computer 105A (Step 400). The target computer 105B waits until it receives a snapshot of the memory and processor state of the source computer 105A (Step 410). The target computer 105B proceeds to apply the snapshot of the memory and processor state of the source computer 105A to the target computer 105B (Step 430). The duplication engine reads the configuration from Reserved Memory of the target computer. The target computer applies this configuration.

Figure 5:
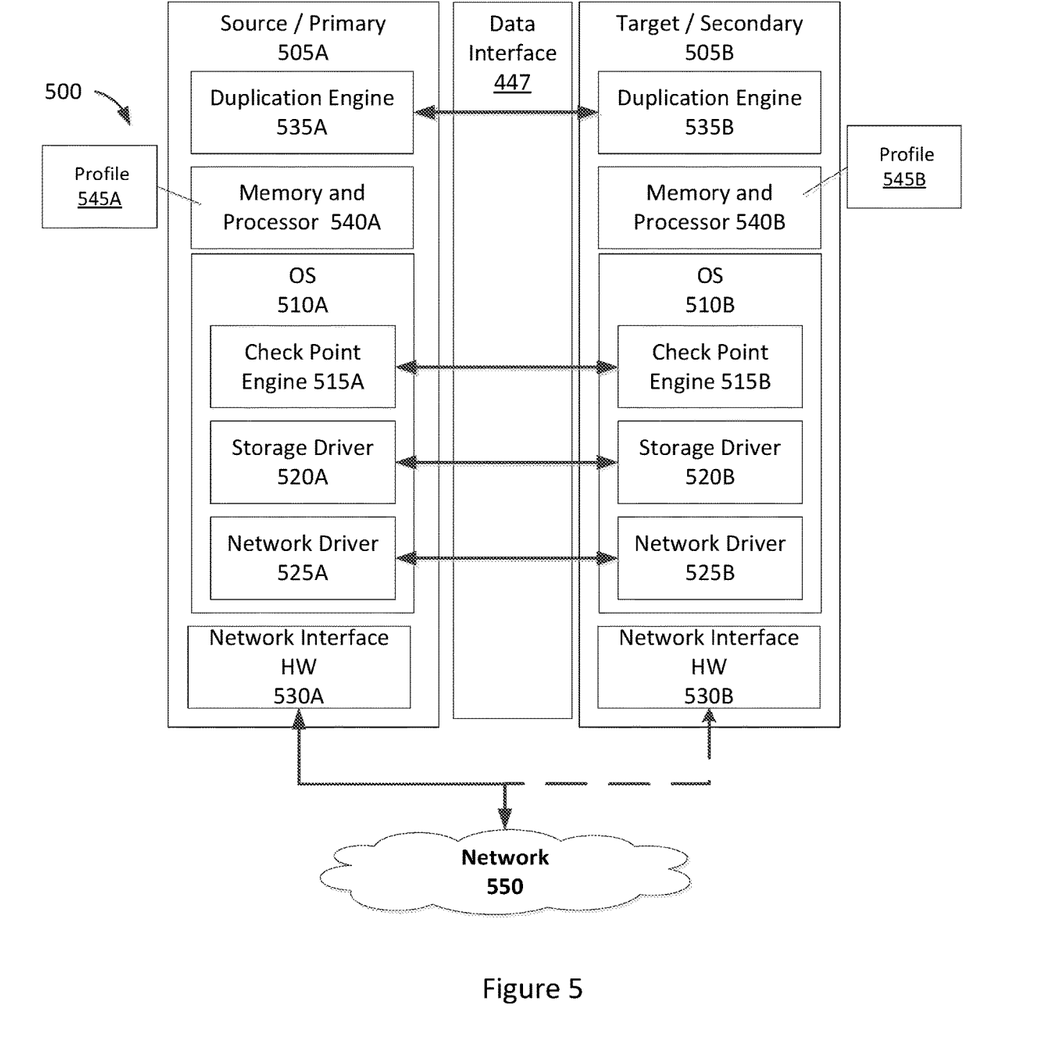
FIG. 5 is a schematic diagram of a source computer linked with a target computer in an active active fault tolerant configuration in which each respective computer's operation is at least partially governed by a profile stored in protected memory at each computer.

FIG. 5 is an example implementation of a duplication and configuration system in a fault tolerant (FT) system, in accordance with an embodiment of the present disclosure. This system can use profiles to govern various aspects of a primary computer/node and a secondary computer/node. The FT system 500 includes a primary node 505A, a secondary node 505B, and data interface 547. The data interface may include one or more hardware interfaces suitable to transfer state from the primary/source computer to secondary/target computer.

In one embodiment, primary node 505A includes operating system 510A, network interface hardware 530A, duplication engine 535A, and memory and processor 540A. Secondary includes a duplication engine 535B, memory and processors 540B, operating system (OS) 510B, and network interface hardware 530B. Operating system 510A includes checkpoint engine 515A, storage driver 520A, and network driver 525A. Operating system 510B includes checkpoint engine 515B, storage driver 520B, and network driver 525B. In one embodiment, a given checkpoint engine is used to perform copying/duplication in lieu of a given separate duplication engine.

In FIG. 5, a duplication and configuration system is used to build the FT system 500 comprised of the primary node 505A and the secondary node 505B. The profile 545A for the primary node 505A is stored within reserved memory in primary node 505A and the profile 545B for secondary node 505B is stored within reserved memory in secondary node 505B. In this embodiment, the profile is comprised of a single value which indicates whether a node is configured to be the primary node or the secondary node. The primary node 505A configuration indicates that it is a primary node. The primary node configuration specifies that the primary node 505A directly communicates with client applications over the internet/network 550. The secondary node 505B configuration indicates that it is the secondary node within the FT system 500. A secondary node configuration specifies that the secondary node network and storage drivers are monitoring the processing performed by the primary node, in a fashion that would allow the secondary node to take over from the primary node as needed. This system can be used for active active fault tolerant computing.

As an illustrative example, the secondary node 505B may be in need of initialization and/or resetting to an initial state. The duplication engine 535B contacts the primary node 505A to request that the duplication engine 535A send the primary node's 505A state to the secondary node 505B. The duplication engine 535A sends a request to registered storage and network drivers requesting that they prepare to be duplicated. Upon acknowledgement from the registered storage and network drivers, the duplication engine 535A creates and sends a snapshot of the state of the memory and processors 540A and sends the snapshot to the secondary node 505B. Upon completion of the transfer, the duplication engine 535A requests that the secondary node establish a new configuration on the secondary node and then resume operation.

When receiving the snapshot of the memory and processor 540A, the secondary node 505B applies the snapshot and provides each of the registered network and storage drivers with configuration information from the profile 545B. Upon acknowledgement from the network and storage drivers that the new configuration has been implemented, the secondary node 505B continues execution.

In various active active embodiments, the network driver 525A on primary node is dealing directly with the network interface hardware 530A that is receiving packets from network 550. Similarly, in some embodiments, the secondary node is receiving network packets from primary node and not from network 550. As a result, the network driver 525B operates and performs in a different manner that is informed by its profile 545B. In one embodiment, the changes in operation that a driver can be configured to perform and subsequently reconfigured to perform can be programmed at that the driver level. Accordingly, the profile may server as a flag or switch that sets the different modes of operation that have been programmed and that are possible at the driver, OS, checkpoint engine, etc. levels. In one embodiment, every checkpoint or duplication event that occurs results in profile change or profile reconfiguration in response to checking the profile stored in protected memory.

General and Specific Computer-Based Implementations and Embodiments

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding" or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The disclosure may be embodied in other specific forms without departing from the spirit or essential characteristics thereof. The foregoing embodiments are therefore to be considered in all respects illustrative rather than limiting on the disclosure described herein. Scope of the disclosure is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method of managing operation of computing system, the method comprising:
    sending a request, from a target computer, to initiate a duplication process from the source computer;
    upon receipt of the request, notifying, at the source computer, each application and device to prepare for the impending duplication process;
    creating, at the source computer, a copy of the memory and processor state;
    sending the copy of the memory and processor state of the source computer to the target computer;
    providing a configuration profile on the target computer, wherein the configuration profile includes one or more possible configurations of the target computer, wherein the configuration profile is stored in reserved memory on the target computer, wherein the reserved memory is protected from being overwritten by the duplication process;
    establishing the configuration at the target computer;
    applying, at the target computer, the copy received from the source computer; and
    resuming execution of the source computer and the target computer.

2. The method of claim 1 further comprising checking contents of reserved memory for profile; and changing driver operation in response to the profile.

3. The method of claim 2, wherein the reserved memory is selected from the group consisting of portable memory device, memory stick, USB memory device, CMOS memory, NVRAM, BIOS, EPROM, and RAM.

4. The method of claim 1, wherein copy of the memory and processor state are sent to duplication engine of target computer.

5. The method of claim 1, wherein establishing the configuration at the target computer is performed with regard to network and storage drivers of target computer.

6. The method of claim 1, wherein the applying, at the target computer, comprises:
receiving the copy of the memory and processor state of the source computer;
applying the copy to the target computer;
retrieving configuration information from the configuration profile stored in reserved memory on the target computer; and
configuring applications and devices on the target computer according to the configuration information.

7. The method of claim 1, wherein establishing the configuration at the target computer is performed using configuration stored in reserved memory of target.

8. The method of claim 1 further registering one or more application or device driver such that they are prepared for duplication.

9. The method of claim 1, wherein the configuration indicates a target computer profile of a source computer profile.

10. The method of claim 1 further comprising reading configuration from reserved memory, using duplication engine, wherein target computer applies the configuration.

11. The method of claim 10 wherein the duplication engine is a checkpoint engine.

12. A method of managing operation of computing system, the method comprising:
sending a request, from a target computer, to initiate a duplication process from the source computer;
upon receipt of the request, notifying, at the source computer, each application and device to prepare for the impending duplication process;
creating, at the source computer, a copy of the memory and processor state;
sending the copy of the memory and processor state of the source computer to the target computer;
providing a configuration profile on the target computer, wherein the configuration profile includes one or more possible configurations of the target computer;
establishing the configuration at the target computer;
applying, at the target computer, the copy received from the source computer; and resuming execution of the source computer and the target computer, wherein one or more drivers change mode of operation in response to a change in or a new profile.

13. A method of managing operation of computing system, the method comprising:
sending a request, from a target computer, to initiate a duplication process from the source computer;
upon receipt of the request, notifying, at the source computer, each application and device to prepare for the impending duplication process;
creating, at the source computer, a copy of the memory and processor state;
sending the copy of the memory and processor state of the source computer to the target computer;
establishing the configuration at the target computer;
applying, at the target computer, the copy received from the source computer; resuming execution of the source computer and the target computer;
resuming execution of the source computer and the target computer;
detecting a failure mode or error event at source computer; and
changing configuration of target computer.

14. The method of claim 13, wherein changing of configuration is performed by duplication engine.

* * * * *